United States Patent [19]
Wallace

[11] 3,927,431
[45] Dec. 23, 1975

[54] VENTILATING SPACER FOR BEEHIVE

[76] Inventor: Henry L. Wallace, 214 E. Main St., West Union, Ohio 45603

[22] Filed: Apr. 13, 1973

[21] Appl. No.: 350,758

[52] U.S. Cl. .................................................. 6/1
[51] Int. Cl.² ........................................ A01K 47/00
[58] Field of Search ............ 6/1, 4 R, 4 A, 4 B, 4 M

[56] References Cited
UNITED STATES PATENTS

| | | | |
|---|---|---|---|
| 123,654 | 2/1872 | White | 6/1 |
| 1,370,775 | 3/1921 | Bacon | 6/4 R |
| 1,491,213 | 4/1924 | Troilo | 6/4 R |
| 2,400,674 | 5/1946 | Williams | 6/1 |
| 3,108,294 | 10/1963 | Brown, Jr. | 6/4 B |

Primary Examiner—Russell R. Kinsey
Assistant Examiner—J. Q. Lever
Attorney, Agent, or Firm—Cain and Lobo

[57] ABSTRACT

A ventilating spacer for a movable frame beehive. The spacer is used during the summer months and permits the bees to ventilate a hive so plentifully that the formation of queen cells is suppressed and the natural tendency of the bees to swarm is essentially negated. Oppositely disposed ventilation openings in the spacer are screened and provided with a protective shield to keep the beehive dry. The spacer is adapted to fit beneath any standard, commercially available beehive roof or cover. The use of the spacer unexpectedly saves much work incident to the maintenance of the hive.

9 Claims, 3 Drawing Figures

U.S. Patent   Dec. 23, 1975   3,927,431
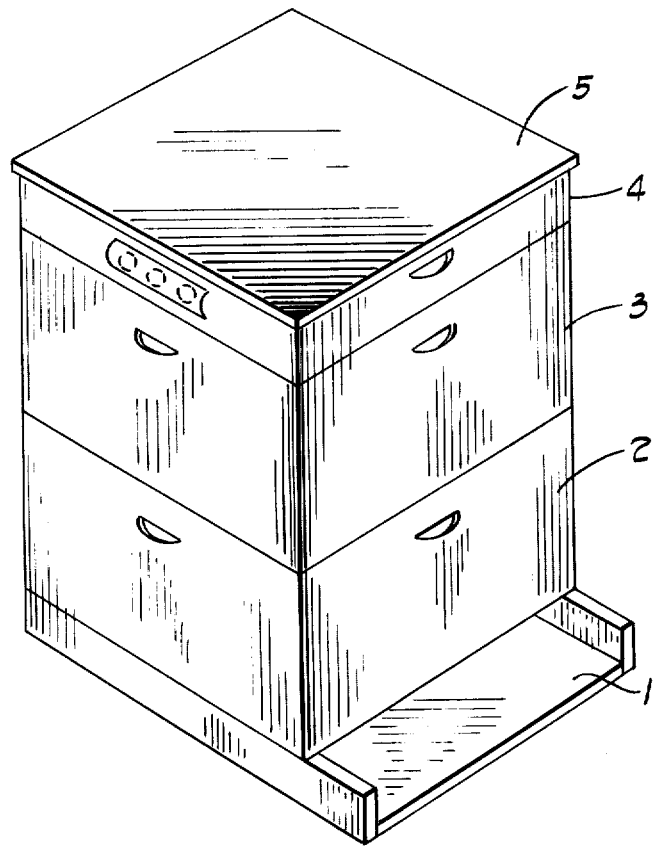
Fig. 1
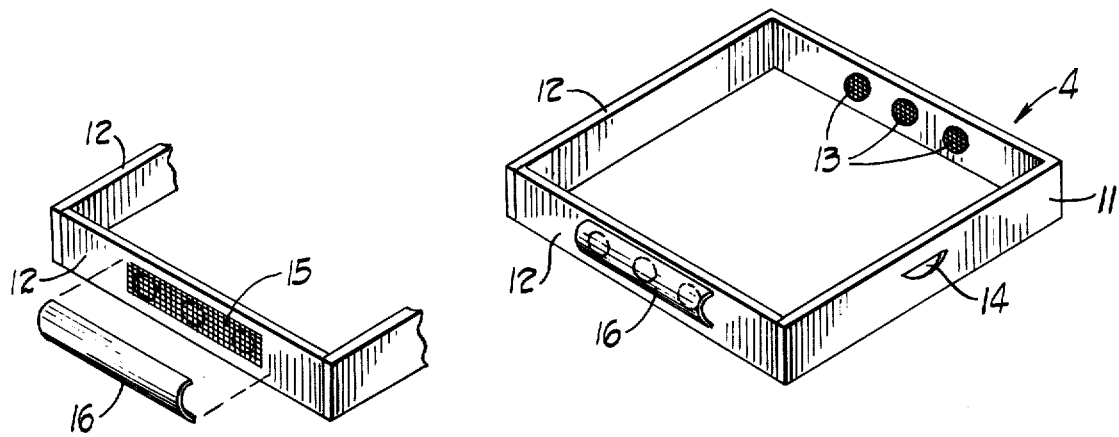
Fig. 3
Fig. 2

VENTILATING SPACER FOR BEEHIVE

BACKGROUND OF THE INVENTION

In the spring or early summer, after several weeks of incessant laying of eggs by the queen bee, thousands of young bees emerge daily from the combs of a hive which can no longer accommodate its teeming population. It is at this stage that the bees build a number of queen cells and prepare for swarming which is their natural way of multiplication. These queen cells are necessary to replace the old queen who will leave the hive with the swarm, usually after the first of the new queens has emerged. During the warm part of a summer day, apiarists are apt to watch in dismay as bees rush headlong out of a hive and cluster, with a little luck, upon the limb of a nearby tree, shrub, or suitable object.

Whatever the reason, when the bees swarm it is at the very least, a great nuisance to recapture and hive the swarm. Not infrequently, swarming leads to the loss of a entire colony of bees. Hiving a swarm, for the experienced apiarist is not difficult once the cluster is secured. It is more preferable, however, to transfer a swarm to a fresh hive at one's convenience rather than wait for swarming and thereafter to move the bees into an empty hive. Experienced beekeepers no longer, for example, "consider it important to know how to hive a swarm, but consider it essential, for top honey production, to know how to operate colonies so that they will not swarm". (Beekeeping in Wisconsin by Henry J. Rahmlow, Cooperative Extension Program, University of Wisconsin, October 1968, Page 1).

It is well-known among apiarists that the following preventive measures will help minimize the desire of a colony of bees to swarm: (1) provide plenty of storage room for surplus honey; (2) provide the queen with ample egg laying space; (3) eliminate all large areas of drones in the comb; (4) provide the colony with a young, vigorous queen to prevent supercedure; (5) provide adequate watering places for the bees; (6) remove combs of brood and replace with extra combs to relieve congestion.

Despite the foregoing precautions, the prevention of swarming is often a failure because what is not so well-known, probably, simply because it has been overlooked, is the importance of plentiful ventilation in the hive. Summer temperatures, particularly those generated under the direct blaze of a summer sun, are known to be harmful to a hive and therefore, hives are commonly shaded from the sun during hot weather, and, if no natural shade is available, some sort of protection over the hive is deemed a necessity. Again, it is known to be desirable, but usually too time-consuming to be economical, to cull a hive in which too many drones are present, for the presence of too many drones is an inducement to the colony to swarm. Moreover, burly, noisy drones are constantly in the way during the honey harvest.

In localities where the swarming season occurs during the main honey flow, as in much of the northeastern portion of the United States and in Canada, reducing two-story colonies to a single story (which is compactly filled with brood) and placing comb honey supers is desirable from the point of view of honey production, but is, unfortunately, highly conductive to swarming. Great care must be taken, at a critical time such as this, to induce the bees to enter the comb-honey supers promptly and set to work to prevent crowding of the brood-nest. If the colonies can be carried over the critical period, after giving the first comb-honey supers, the battle against swarming is often half won.

In some of the southern states, as well as in some portions of the West, the swarming season occurs previous to the main honey flow, making the problem of swarm control quite different from that of localities where the swarming season occurs during the main honey flow. In such cases, the expansion of the hive by placing a second and even a third story of old black combs, and in some cases by raising brood into the upper story to induce the queen to expand her work through at least two stories, often prevents swarming entirely. In some cases, alternating the combs of brood with frames of foundations through two stories is an effective swarm-preventive measure in such localities.

In either type of locality, whether it be one in which the swarming season occurs during the honey flow or one in which the swarming occurs some time previous to the main honey flow, the problem is to carry the bees over to the beginning of the honey flow without swarming. In the latter type of locality, swarming is usually more easily controlled, but in the former type where the swarming season occurs during the main honey flow, swarming is indeed troublesome.

On rare occasions, during periods of high temperature, when the summer nectar is flowing, the entire entrance piece is removed from a hive to allow less restricted circulation both of bees and of air. Additionally, ventilation is aided by "staggering" the top super by about one-fourth (0.25) of an inch, despite the recognized risk that a staggered hive is an invitation to the twin perils of an unexpected rain storm and an invasion by the bee moth.

Commercially swarming is reduced by producing extracted honey instead of comb honey, using very large hives, and artifically swarming, or dividing the hives when an increase is wanted. However, because of the increasing popularity of comb honey, the necessity of controlling swarming has become of paramount importance. The ventilating spacer of this invention is directed to the need for a better way of preventing natural swarming, and to a more acceptable way of providing plentiful ventilation than simply staggering the top super in a hive.

Though the ventilating spacer of this invention unexpectedly essentially eliminates swarming, discussed hereinabove, this is not its only function. It also screens out the bee moth or greater wax moth which is so apt to invade a hive merely "staggered" for ventilation. The most effective natural enemies of the wax moths are the bees themselves. When the colony is strong, the bees will carry the moths out of the hive and prevent any damage by the larvae. Plenty of ventilation is an absolute necessity to obtain a healty bee colony. Therefore, any beekeeping practices or manipulations that help maintain strong colonies will also help decrease the chances of greater wax moth infestation. There is no better insurance against the ravages of the pest, than to have strong, queen-right colonies, and I have found that plentiful ventilation provides such insurance.

SUMMARY OF THE INVENTION

It has been discovered that plentiful ventilation of a beehive during the hot summer months unexpectedly essentially eliminates the natural swarming propensity of bees.

It has also been discovered that plentiful ventilation of a beehive unexpectedly suppresses the number of normal queen cells formed.

It is, therefore, a general object of the ventilating spacer of this invention to enable bees to provide, naturally, plentiful ventilation of their hive during the hot summer months when it is subjected to relatively high temperatures, in excess of 85°F.

It is another object of this invention to provide a simple, easy to use, interchangeable spacer which may be disposed immediately beneath the cover of a hive so as to provide plentiful ventilation in a normal hive to effectively prevent swarming.

It is a further object of this invention to enable bees to provide sufficient ventilation in a beehive, and thus substantially lower the number of queen cells formed. This eliminates the need to cull and destroy queen cells.

It is still another object of this invention to provide enough ventilation in a beehive so as to induce the growth of bigger and stronger colonies which produce more honey.

It is yet another object of this ventilating spacer to permit a substantially greater circulation of air after the honey is stored so as to enable the honey to ripen more quickly.

It is also an object of this invention to provide a spacer having screened apertures downwardly displaced from the horizontal center line of the spacing frame which apertures are protected from rain by a protective shield, without interferring with the fit of a standard roof or cover.

These and other objects, features and advantages of this invention will become apparent to those skilled in the art from the following description of a preferred form thereof, reference being had to the accompanying drawings.

BRIEF DESCRIPTION OF THE DRAWING

FIG. 1 is a perspecitve veiw, partially broken away of a movable-frame beehive, including a ventilating spacer.

FIG. 2 is a perspective view of the ventilating spacer.

FIG. 3 is a perspective view of a portion of the spacer showing details of ventilation openings and a protective shield.

In the figures of the drawing, like reference numerals are used to denote like parts. Some of the parts are dimensionally exaggerated for clarity of illustration and to facilitate the description of the article and the manner in which it benefits the operation of a beehive.

DETAILED DESCRIPTION OF THE INVENTION

Nearly all of the work incident to the maintenance of a successful apiary is required during the warm months of the year, generally from May to October, in the Northern Hemisphere. The great demands on an apiarist's time during the "season" requires that the number of maintenance chores be kept to a minimum. Coincidentally, during hottest part of the summer, when the honey is stored, the bees are, generally, temperamentally at their worst. It is during these critical months that the ventilating spacer of this invention is most beneficial.

Referring now to the drawings, a modern bee-hive includes a floor, shown generally at 1, known to beekeepers as a bottom board. Resting on the bottom board 1 is a brood chamber, shown generally at 2, also called the body, upon which is disposed a storeroom or comb honey super, shown generally at 3, for storing the surplus honey an apiarist takes from bees. The super 3 is provided with a ventilating spacer shown generally at 4, resting thereupon. A roof or cover, shown generally at 5, fits over the spacer 4.

In the modern, movable frame hive which is universally used by apiarists because of the insight they give into colony behavior, and the manipulations they permit, the box-like frame sections of the brood chamber 2, shallow extracting super (if used), and comb honey super 3 are dimensionally the same in horizontal cross-section to enable them to be stacked one on the top of another interchangeably. The bottom board 1 and the roof or cover 5 are constructed so as to fit any of the box-like frame sections. All the parts of the hive mentioned herein, except for the spacer 4, are conventional, commercially available articles and require no further elaboration. The desired details may be found in textbooks on bee culture such as "The Bee Primer" by C.P. Dadant, American Bee Journal, Hamilton, Ill.

Referring now to FIG. 2, the ventilating spacer 4 comprises a spacing frame 11 formed by upstanding sidewalls 12 and 12'. The frame 11 is conventionally rectangular and the horizontal cross-section of the frame is the same as that of the beehive in which it is to be used. It will be evident that there is nothing critical about the shape of the spacing frame provided it is adapted to be sealingly disposed upon other parts of the hive such as the comb honey super or shallow extracting super. The spacer is referred to be sealingly disposed, upon a super when the bottoms of the sidewalls 12 and 12' rest on the super so as to exclude both water and insects from the interior of the beehive. The sidewalls 12 are conveniently formed of wood slats of the same thickness, about 0.75 inch, used for other parts of the hive, and are preferably about 5 inches high and about 20 inches long.

Two oppositely disposed sidewalls 12 of the spacing frame 11 are provided with ventilation openings 13, which are always open, to promote a cross-flow of air across the top of the hive. It is preferred to provide plural openings in each sidewall, each opening being about 2 inches in diameter. The precise open area provided by the ventilation openings 13 is not critical; in general, a pair of oppositely disposed 2-inch diameter openings may be barely sufficient in a standard, well-filled hive, and oppositely disposed sidewalls which are essentially totally open, as for example, where the sides are entirely screened sections, provide inadequate protection against a sudden drop in temperature. The choice of total area of ventilation openings will vary, generally within the limits mentioned, depending upon the size of the hive, the height of the spacing frame, the population of the hive, the temperature fluctuations in the locality, etc., and is easily arrived at with a minimum of experimentation.

The sidewalls 12' of the spacing frame are provided with recesses 14 to provide a finger-hold for moving the spacer. If desired, the sidewalls 12' may also be provided with ventilation openings such as those described hereinabove, but is generally found unnecessary.

Irrespective of which sidewalls are provided with the ventilation openings 13, when a standard 5-inch wide slat is used to construct the spacing frame and 2-inch diameter openings are provided, it is essential that the horizontal center line of the openings be displaced downwardly from the longitudinal axis of the slat, as will be described hereinafter.

The openings 13 are covered with a screening material 15 having a mesh size small enough to exclude honey bees and particularly, the bee moth, but large enough to be permeable to insects substantially smaller than a honey bee. A preferred mesh size is from about 6 to about 20 Tyler mesh. Mesh sizes that are too small may be adequately air permeable but tend to get clogged with dust and, therefore, are inconvenient. The screening material 15 may be secured over the openings by any convenient means such as by staples or tacks (not shown). The material 15 is ineffective to prevent the leakage of water, specifically rain, into the hive.

The interior of the hive is kept dry and at the same time protected from the direct rays of the sun by a protective shield 16 such as may be formed as an arcuate U-shaped trough, from any corrosion resistant material. Sheet metal, particularly galvanized sheet-metal is well-suited for the purpose, but an extrudate of plastic material may also be used. The shield 16 is adpated to be secured at its upper and lower edges in the sidewalls 12 so as to divert water away from the openings 13. The precise shape of the shield 16 is not critical provided it sheds water and does not interfere either with the open communication of the interior of the hive, with the atmosphere, or with the fit of the cover 5 on the spacer 4. The U-shaped member shown as the protective shield 16 is a preferred form when 2-inch openings are provided in a standard 5-inch slat. It will be found that when the openings are displaced downwardly from the horizontal center line of the sidewalls 12, the shield 16 may be secured over the screened openings without interfering with the normal fit of a commercially available standard beehive cover which is provided with side-flanges so positioned as to fit telescopically down over the sidewalls of a super.

The ventilating spacer is normally installed in a hive in June or July, in the Northern states. It is found that queen cell formation is unexpectedly suppressed to such an extent as to make it unnecessary repetitiously to hunt and cull all the frames for queen cells as a preventive measure against swarming. The placing of the ventilating spacer provides plentiful ventilation and unexpectedly prevents swarming. The bees, therefore, work more industriously and tend to build bigger and better colonies which are more productive. The additional production of honey is ripened more quickly because the ventilation of the hive accelerates removal of moisture from the honey. The accelerated ripening permits earlier removal of filled supers and minimizes the risk of damage to filled supers, should a period of damp weather occur, by exposure of filled supers to excess moisture. Unexpectedly, the use of a ventilating spacer permits the placing of a shallow extracting super above a comb honey super and with this arrangement, a greater yield of honey is obtained more expeditiously.

The spacer is exceedingly simple in construction, possesses no interior parts, any may be manufactured with existing machinery used for commercial production of beehives.

Modifications, changes, and improvements to the preferred forms of the invention herein disclosed, described and illustrated may occur to those skilled in the art who come to understand the principals and precepts thereof. Accordingly, the scope of the patent to be issued herein should not be limited to the particular embodiments of the invention set forth herein, but rather should be limited by the advance by which the invention has promoted the art.

I claim:

1. A ventilating spacer for a beehive having a plurality of vertically stacked supers defining upstanding sidewalls and a shallow, flat cover defining a roof for the hive, and having flanges extending downwardly, outwardly of daid sidewalls, respectively, said spacer comprising a respectively, said spacer comprising a relatively shallow, rectangular spacer frame of four sidewalls, open both at the top and bottom, and unobstructed within its said spacer frame sidewalls, said spacer frame sidewalls being adapted to be in vertical alignment with said upstanding sidewalls of said supers and within said flanges of said cover and being further adapted to be removably disposed intermediate the said uppermost super and said cover and in sealing relationship with said upstanding sidewalls and said spacing frame having oppositely disposed ventilation openings selectively permeable to insects smaller than honey bees and bee moths.

2. A ventilating spacer for a beehive having a plurality of vertically stacked supers defining upstanding sidewalls and a shallow, flat cover defining a roof for this hive, and having flanges extending downwardly outwardly of said sidewalls respectively, said spacer comprising a relatively shallow, rectangular spacer frame of four sidewalls, opened at the top and bottom, and unobstructed within its said spacer frame sidewalls, said spacer frame sidewalls being adapted to be in vertical alignment with said upstanding sidewalls of said supers and within said flanges of said cover and being further adapted to be removably disposed intermediate the said uppermost super and said cover and in sealing relationship with said upstanding sidewalls and said cover, said cover, said spacing frame having oppositely disposed ventilation openings selectively permeable to insects smaller than honey bees and bee moths, and a protective shield fixedly attached to said spacing frame, above said openings, to divert water away from the interior of said hive, and to shade said interior from direct sunlight.

3. The spacer of claim 2 wherein said openings are downwardly displaced from the horizontal center line of said spacing frame so as to permit a said cover to be sealingly disposed thereupon, and said openings are screened with a screening material ranging from about 6 to about 20 Tyler mesh.

4. A movable frame beehive having cover means telescopically snugly disposed upon a ventilating spacer removably disposed intermediate said cover and the uppermost super of said beehive and in sealing relationship therebetween, said spacer comprising a relatively shallow, rectangular spacing frame of four side walls, open both at the top and at the bottom, and unobstructed within said spacer frame sidewalls said spacing frame having oppositely disposed ventilating openings selectively permeable to insects smaller than honey bees and bee moths.

5. The beehive of claim 4 including a protective shield fixedly attached to said spacing frame above said openings, to divert water away from the interior of said hive, and to shade said interior from direct sunlight.

6. The beehive of claim 5 wherein said openings are downwardly displaced from the horizontal center line of said spacing frame so as to permit a said cover to be sealingly disposed thereupon, and said openings are screening material ranging from about 6 to about 20

Tyler mesh.

7. A ventilating spacer for a beehive having upstanding sidewalls and a cover, said spacer comprising a spacing frame, open both at the top and at the bottom, adapted to be removably disposed intermediate the uppermost super and said cover, and in sealing relationship with said sidewalls and said cover, said spacing frame having oppositely disposed ventilation openings selectively permeable to insects smaller than honey bees and bee moths and a protective shield fixedly attached to said spacing frame, at each said opening, to divert water away from the interior of said hive, and to shade said interior from direct sunlight, each said protective shield comprising an elongated arcuate member fixedly attached at its upper and lower edges to "said spacing frame."

8. The spacer of claim 7 wherein said openings are downwardly displaced from the horizontal center line of said spacing frame so as to permit a standard beehive cover to be sealingly disposed thereupon, and said openings are screened with a screening material ranging from about 6 to about 20 Tyler mesh.

9. The ventilating spacer according to claim 8 as part of a movable frame beehive with cover means telescopically snugly disposed upon said ventilating spacer, said ventilating spacer being removably disposed intermediate said cover and the uppermost super of said beehive and in sealing relationship therebetween.

* * * * *